UNITED STATES PATENT OFFICE.

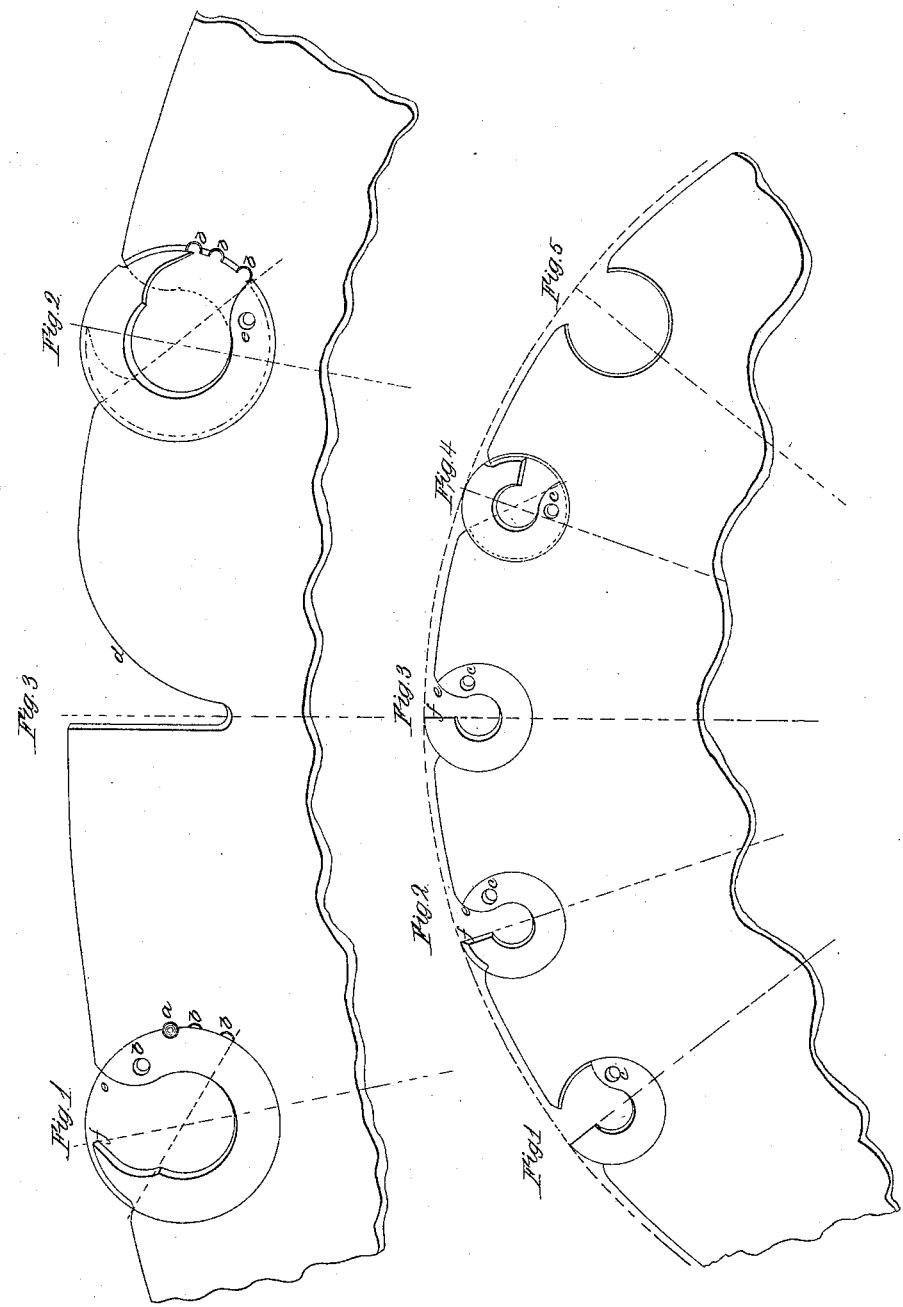
W. P. Miller,
Saw Teeth,
Nº 58,664. Patented Oct. 9, 1866.
Witnesses
Inventor
Warren P. Miller

WARREN P. MILLER, OF SAN FRANCISCO, CALIFORNIA.

IMPROVEMENT IN SAWS.

Specification forming part of Letters Patent No. 58,664, dated October 9, 1866.

*To all whom it may concern:*

Be it known that I, WARREN P. MILLER, of the city and county of San Francisco and State of California, have invented a new and Improved Mode of Attaching Teeth to Saws; and I do hereby declare that the following is a full and exact description thereof, reference being had to the accompanying drawings, making a part of this specification, in which—

Design No. 1 is a segment of a saw for splitting, showing two teeth. Figure No. 1 represents a tooth set for work. Fig. No. 2 represents a tooth as being inserted into the seat prepared in the plate. So much of the groove on the cutting end of the tooth as when in position projects beyond the cavity in the plate is cut away, allowing it to come within the V, as shown. $a$ is a rivet inserted through the groove to prevent the tooth from being forced back. $b\ b\ b$ are holes in the plate for the purpose of inserting rivets at different distances as the tooth is turned forward, as it becomes necessary, from time to time, as the point of the tooth is worn away. Fig. No. 3 represents a slit cut in the periphery of the saw-plate, centrally between the teeth, the front side being on a line with the radius, the opposite side being rounded off, as shown at $d$. The object of the above-described cavity is for the purpose of receiving and carrying forward any dust that may escape the preceding tooth.

Design No. 2 represents a segment of a saw with the teeth filed for cutting off. Fig. No. 1 represents a tooth worn and filed away, so that it occupies but little more than half of the circle, and is not capable of being again adjusted. Figs. No. 2 and 3 represent teeth set in the proper position for work, each filed from opposite sides. Fig. No. 5 shows a seat in the plate prepared for a tooth with a V-edge.

The teeth are pierced at $c$, for the purpose of inserting a pin by which they may be turned in their seat.

The object of my invention is to have a saw-tooth of such form that it can be cheaply and perfectly made; a tooth that can be made in duplicate with perfect accuracy, and being adjusted without the use of a forge; a tooth that is strong, self-attaching, has plenty of room for the chip, and will not choke or clog with the dust. If the point of a tooth is broken off, it is only necessary to start it forward up to the radius-line, and it will then project the same as before.

To construct a saw on the plan herein described you will proceed to form the circular cavities in the plate by means of a suitable cutter, forming a V on the inner edge and at an angle of forty-five degrees. Prepare circular pieces of steel for the teeth a little larger than is required when finished. Pierce them in the center, place them on a mandrel and turn them in a lathe, and cut out the V-groove. Cut away that part of the circle between the heel $e$ and the point of the tooth $f$. Then pierce them at $c$, temper the teeth, and they are ready to insert in the plate.

What I claim as my invention, and desire to secure by Letters Patent, is—

An insertible tooth for saws when said tooth is constructed upon lines having a true circle and comprising more than one hundred and eighty degrees of a circle, and inserted into a cavity in the saw-plate of a shape to fit said tooth, substantially as described.

WARREN P. MILLER.

Witnesses:
 E. D. WHEELER,
 H. CLARK.